(12) United States Patent
Cordivari et al.

(10) Patent No.: US 7,966,855 B2
(45) Date of Patent: Jun. 28, 2011

(54) SHAPED COMPOSITES AND METHOD OF MAKING THEREOF

(75) Inventors: Matthew A. Cordivari, Bloomfield, NJ (US); Vassili Gotsko, Nutley, NJ (US); Timothy J. Hagan, Succasunna, NJ (US); Frank J. Karpowicz, Franklin Boro, NJ (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 574 days.

(21) Appl. No.: 11/670,214

(22) Filed: Feb. 1, 2007

(65) Prior Publication Data

US 2007/0212198 A1   Sep. 13, 2007

Related U.S. Application Data

(60) Provisional application No. 60/764,115, filed on Feb. 1, 2006.

(51) Int. Cl.
*B21D 39/02* (2006.01)
*B21D 53/20* (2006.01)

(52) U.S. Cl. .................................. 72/51; 72/199; 470/41

(58) Field of Classification Search ......... 72/51, 370.01, 72/197, 199, 214, 220; 470/41, 42, 162, 470/163
See application file for complete search history.

(56) References Cited

U.S. PATENT DOCUMENTS

| | | | | |
|---|---|---|---|---|
| 507,291 A * | 10/1893 | Spooner | ........................... | 470/42 |
| 529,847 A * | 11/1894 | Barnett | | |
| 653,084 A * | 7/1900 | Hart | ............................... | 470/41 |
| 887,630 A * | 5/1908 | Hart | ............................... | 470/163 |
| 1,262,882 A * | 4/1918 | Warner | ........................... | 72/159 |
| 1,989,750 A * | 2/1935 | Garrett | ............................ | 470/42 |
| 2,193,661 A * | 3/1940 | Young | ............................ | 411/531 |
| 2,410,204 A * | 10/1946 | Cummins | ..................... | 470/163 |
| 2,470,036 A * | 5/1949 | Lemay | ............................ | 72/158 |
| 2,783,816 A * | 3/1957 | Wolf | ................................ | 72/463 |
| 2,909,832 A * | 10/1959 | Cousino | ................... | 29/898.058 |
| 3,453,672 A * | 7/1969 | Gohs | ................................ | 470/42 |
| 3,461,471 A * | 8/1969 | Mellowes | ......................... | 470/42 |
| 3,494,400 A * | 2/1970 | McCoy et al. | ................. | 411/150 |
| 3,606,357 A | 9/1971 | Yonkers | | |
| 3,855,383 A * | 12/1974 | Dahlgren | ...................... | 264/230 |
| 3,902,209 A * | 9/1975 | Gohs | ................................ | 470/42 |
| 4,203,309 A * | 5/1980 | Ermakov et al. | .................. | 72/96 |
| 5,509,738 A | 4/1996 | Haynes et al. | | |
| 5,821,204 A | 10/1998 | Kato et al. | | |
| 5,879,791 A | 3/1999 | Kato et al. | | |
| 5,895,119 A | 4/1999 | Miyasaka et al. | | |
| 6,513,979 B2 | 2/2003 | Mori et al. | | |
| 6,923,033 B2 * | 8/2005 | Hering | ............................ | 72/133 |
| 6,945,833 B2 | 9/2005 | Thomson et al. | | |
| 2003/0031526 A1 | 2/2003 | Grant | | |

FOREIGN PATENT DOCUMENTS

| | | |
|---|---|---|
| DE | 120753 C | 5/1901 |
| EP | 0136211 A | 4/1985 |
| FR | 2580744 A | 10/1986 |
| GB | 1284078 A | 8/1972 |

* cited by examiner

*Primary Examiner* — Flemming Saether
(74) *Attorney, Agent, or Firm* — Abel Law Group, LLP

(57) ABSTRACT

A process of forming a shaped composite material is provided which includes the steps of providing a composite strip having a substantially rigid substrate with a major surface and a polymer overlying the major surface of the substantially rigid substrate. The process further includes shaping the composite strip with a mandrel to form a shaped composite piece having a shape substantially defined by the shape of the mandrel, wherein during the shaping step the major surface of the composite strip is substantially maintained in one plane.

15 Claims, 4 Drawing Sheets

SHAPED COMPOSITES AND METHOD OF MAKING THEREOF

CROSS-REFERENCE TO RELATED APPLICATION(S)

The following application is a nonprovisional application which claims priority to provisional application 60/764,115 filed Feb. 1, 2006.

BACKGROUND

1. Field of the Disclosure

This disclosure is generally directed to composite materials and, more specifically, to methods of forming shaped composite materials.

2. Description of Related Art

Composite materials have long been utilized in various applications. In particular, composite materials have recently been utilized as bearings. Generally, bearings are mechanical devices used for mitigating frictional forces. Bearings generally belong to two broad categories, linear or radial bearings, designated as such based upon the nature of the frictional forces they mitigate. Linear or thrust bearings are used in applications having motion along a straight line, such as moving a drawer in and out. Radial or rotary bearings are used in applications that involve movement around a center axis, such as a wheel on an axis. Additionally, some bearings are designed to deal with both thrust and radial loads.

Various types of materials have been utilized depending upon the type of bearing needed to properly reduce friction. In fact, depending upon the requirements and loads expected in the application, the material of the bearing can range from plastic, metals, to even ceramics. Recent advances have provided a new genre of bearings called self-lubricating bearings, that may be used in more demanding environments, such as the high temperatures of an automobile. The type of material used facilitates the self-lubricating properties of these bearings. Some common self-lubricating materials include various polymers, graphite or Graphalloy® a graphite/metal alloy, and molybdenum disulfide ($MoS_2$). Self-lubricating bearings require little or no oil and typically do not deteriorate with wear as quickly as traditional bearings that rely upon traditional, supplemental lubrication.

The processes used to form bearings varies depending upon the complexity of the shape of the bearing and the material being formed but generally involves techniques such as molding, casting, or stamping operations. Bearings having more complex structures are generally formed through molding or casting processes. Bearings having less complex structures, typically utilize forming processes such as stamping operations, which quickly yield the desired shape from a large sheet of material. However, these processes can be wasteful in light of the cost of the final product.

Accordingly, the industry continues to require improvements to produce high performance composites, such as those used in bearing applications, and as such, the industry also desires processes for forming high performance composites utilizing more cost effective and efficient processing.

DESCRIPTION OF THE RELATED ART

Summary

According to one aspect, a process is disclosed that includes the steps of providing a composite strip made of a substantially rigid substrate having a major surface and a polymer overlying the major surface of the substantially rigid substrate, and shaping the composite strip with a mandrel. The composite strip is shaped to form a shaped composite piece having a shape substantially defined by the shape of the mandrel, such that during the shaping step, the major surface of the composite strip is substantially maintained in one plane.

According to another aspect, a composite washer is provided that includes a composite material made of a substantially rigid substrate and a polymer laminate overlying the substantially rigid substrate. The composite material has an open annular structure with an outer diameter not greater than about 5.1 cm and a forming threshold not greater than about 1.5.

According to a third aspect, a composite washer is provided that includes a composite material made of a metal and a polymer laminate overlying the metal. The composite material having an open annular structure having an outer diameter greater than about 5.1 cm and a forming threshold not greater than about 1.25.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

According to one aspect, a process is disclosed that includes the steps of providing a composite strip made of a substantially rigid substrate having a major surface and a polymer overlying the major surface of the substantially rigid substrate. The process also includes the step of shaping the composite strip with a mandrel composite to form a shaped composite piece having a shape substantially defined by the shape of the mandrel, such that during the shaping step, the major surface of the composite strip is substantially maintained in one plane.

Figure 1:
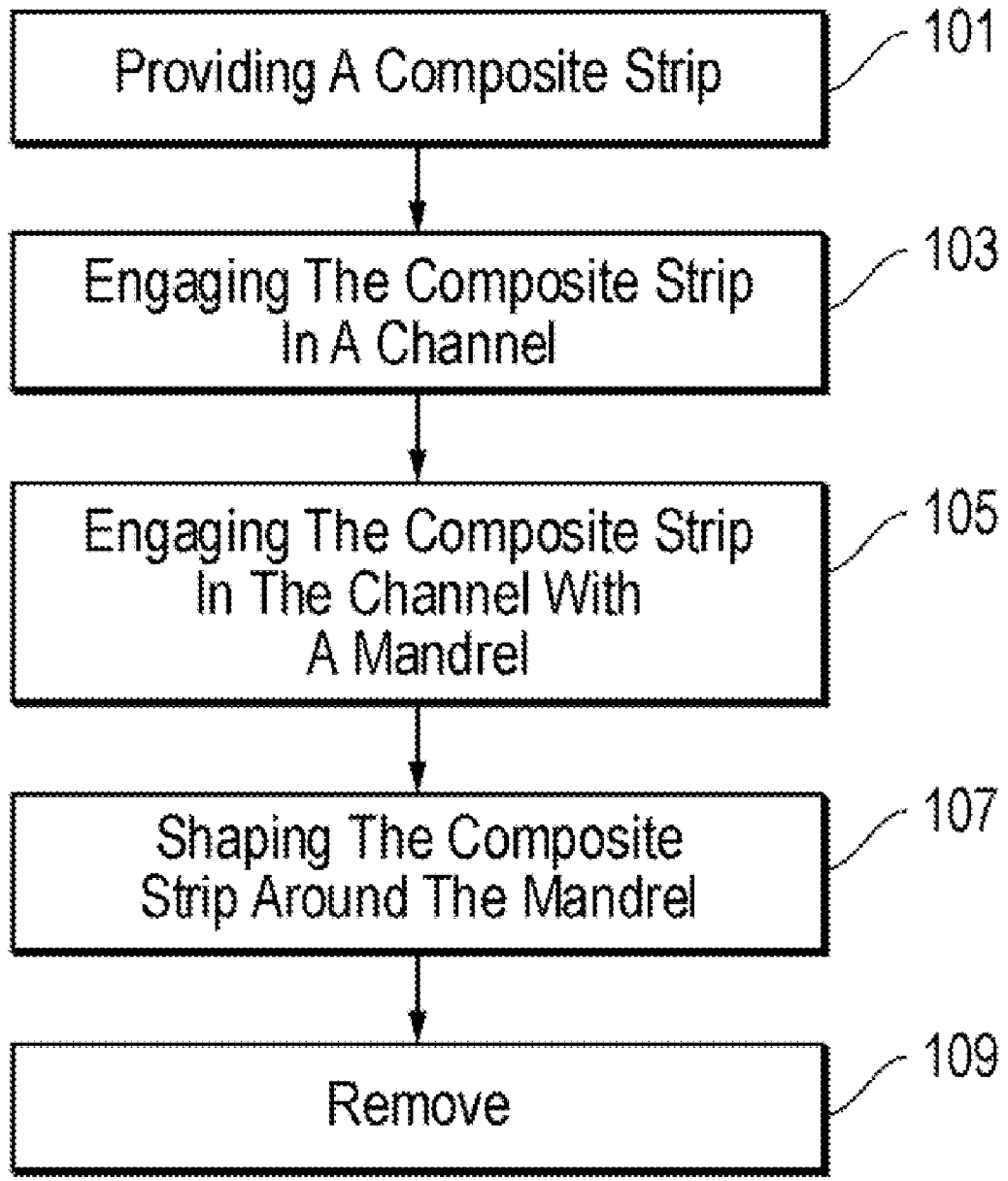
FIG. 1 is a flow chart illustrating a process according to a particular embodiment.
Figure 3A:
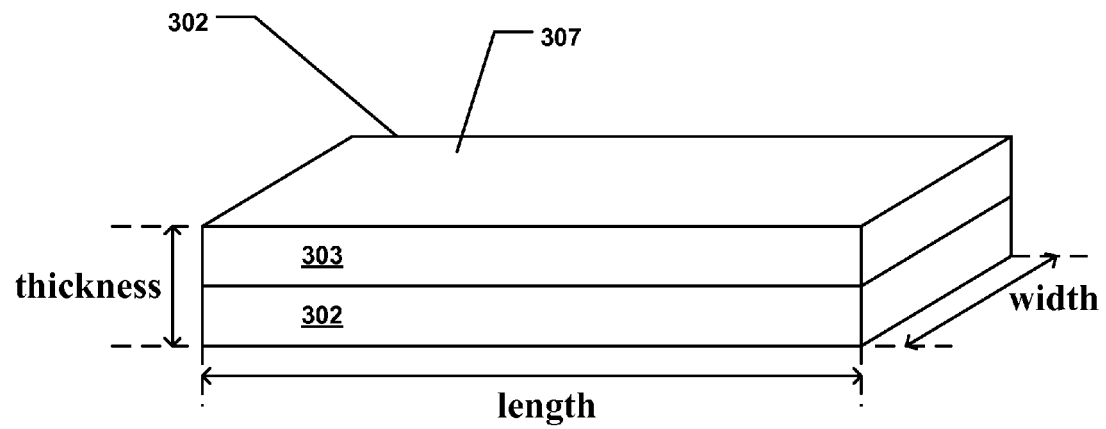
FIGS. 3A-3B include illustrations of certain forming steps described in the flow chart of FIG. 1

Referring to FIG. 1, a flow chart is provided illustrating steps of a scrapless or near-scrapless forming technique for shaping a composite material according to one embodiment. According to FIG. 1, the process is initiated by providing a composite strip 301 that includes a substantially rigid substrate 302 and an overlying polymer layer 303, as illustrated in FIG. 3A. In one embodiment, the substantially rigid substrate 302 includes a metal, metal alloy, or a combination thereof. Suitable metals for the substantially rigid substrate 302 include pliable metals, for example, aluminum, iron, copper, other transition metals, or alloys thereof. Still, according to a particular embodiment the substantially rigid substrate 302 is made of a woven metal mesh.

In further reference to the composite material, the substantially rigid substrate 302 can be generally formed as a strip having a major surface 307. According to one embodiment, the composite strip 301 has an aspect ratio of not less than about 5:1. According to another embodiment, the aspect ratio can be greater, such as not less than about 6:1 or about 8:1. Still, according to a particular embodiment the aspect ratio of the composite strip is not less than about 10:1. As used herein, the term "aspect ratio" is defined as the ratio between the longest dimension of the substrate (the length) and the second longest dimension (the width). The major surface 307 of the substrate 302 is the plane defined by the dimensions of the length and the width. As such, the shortest dimension of the composite strip 301 is the thickness, and according to one embodiment, the thickness of the composite strip 301 is not greater than about 5.0.0 mm, such as not greater than about 4.0 mm, or even not greater than about 3.0 mm. The total thickness of the composite strip is dependent in part upon the thickness of the substantially rigid substrate, which according to one embodiment is not greater than about 3.0 mm, such as not greater than about 1.0 mm or even not greater than about 0.5 mm.

Figure 3B:
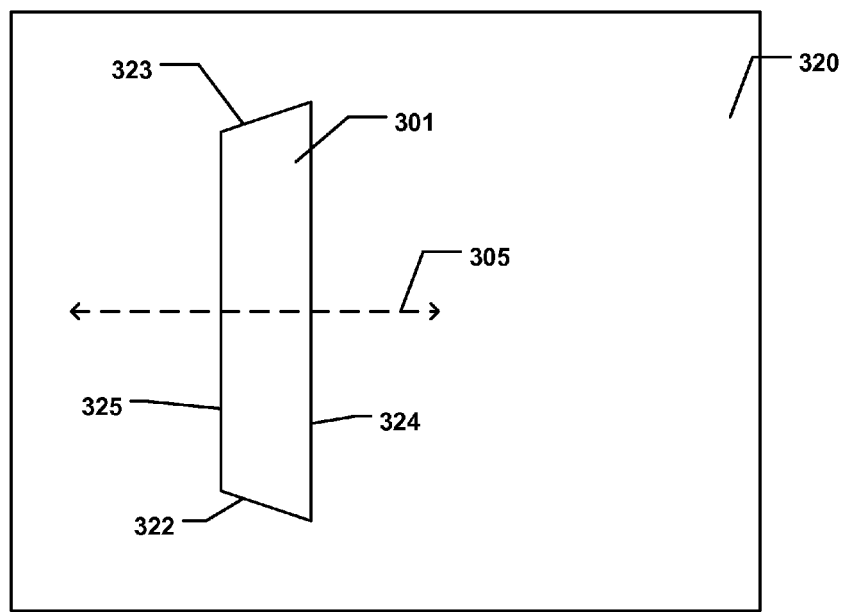

According to another embodiment, the step of providing a composite material includes cutting a composite strip 301 of discrete dimensions from a larger piece of composite material 320 (see, FIG. 3B). For most applications, the length of the composite strip 301 is typically not greater than about 100 cm. According to one embodiment, the length of the composite strip 301 is not greater than about 75 cm, or about 50 cm. Still, the length of the composite strip 301 can be less, such as not greater than about 25 cm, or even about 10 cm. In a particular embodiment, the length of the composite strip 301 is between about 75 cm and about 5 cm. Cutting of the composite strip 301 can be accomplished using manual or automatic devices. Furthermore, cutting of the composite strip 301 can also include cutting the ends 322 and 323 of the composite strip 301 at an angle to the lateral axis 305, such that the ends 322 and 323 of the composite strip 301 are tapered. Tapering the ends of the composite strip makes a length of one side 325 of the composite strip 301 shorter than a length of the opposing side 324 of the composite strip 301. This aids the formation of a composite shape having a gap, such as a composite split-washer as described in a subsequent embodiment.

The step of providing the substrate can also include cutting a substrate of a discrete width from a larger piece of composite material. According to one embodiment, the width of the substrate is not greater than about 5.0 cm, such as not greater than about 4.0 cm, or even not greater than about 3.0 cm. As such, the width of the substrate can be smaller depending upon the desired dimensions of the final piece and can be not greater than about 2.0 cm.

In reference to the composite material, the substantially rigid substrate 302 includes an overlying polymer layer 303, such that the polymer layer 303 is a laminate and substantially overlies the major surface of the substrate 302. The polymer laminate 303 can be obtained from a sheet of material that has been skived or shaved to produce a polymer sheet having a fine thickness, such as less than about 1.0 mm thick. The substrate 302 can be laminated with the polymer sheet, such that the polymer 303 overlies at least a major surface of the substantially rigid substrate 302 as a sheet of material. Optionally, an additional rigid mesh layer, such as a bronze metal mesh layer, can be introduced between the substantially rigid substrate and the polymer laminate layer. Forming the composite material typically includes heat and pressure treatment, as well as an adhesive, such as ethylene tetrafluoroethylene (ETFE), to bond the polymer laminate 303 and the substantially rigid substrate 302. Additionally, a rigid backing layer, such as a metal backing layer can be affixed to the composite material for improved durability and formability.

The metal backing can overlie the substrate 302 or a polymer laminate layer 303. In one embodiment, the polymer layer 303 can substantially overlie a majority of the surfaces of the substrate 302, such as the major surface of the substrate and the sides adjacent the major surface of the substrate. Still, the polymer layer 303 can be a laminate layer that substantially overlies the major surface of the substrate 302, the opposing major surface of the substrate 302, and the adjacent sides of the substrate 302. Generally, the polymer layer 303 is pliable and suitable for forming with the metal. According to one embodiment, the polymer can be a fluoropolymer, such as a polytetrafluoroethylene (PTFE), the addition of which is suitable for use in self-lubricating bearing applications. In addition, the polymer layer 303 can include fillers such as ceramics, ceramic fibers or carbon containing compounds. In a particular embodiment, the composite material is NOR-GLIDE® composite material, commercially available from Saint-Gobain Performance Plastics Corporation, 150 Dey Road, Wayne, N.J.

Figure 2A:
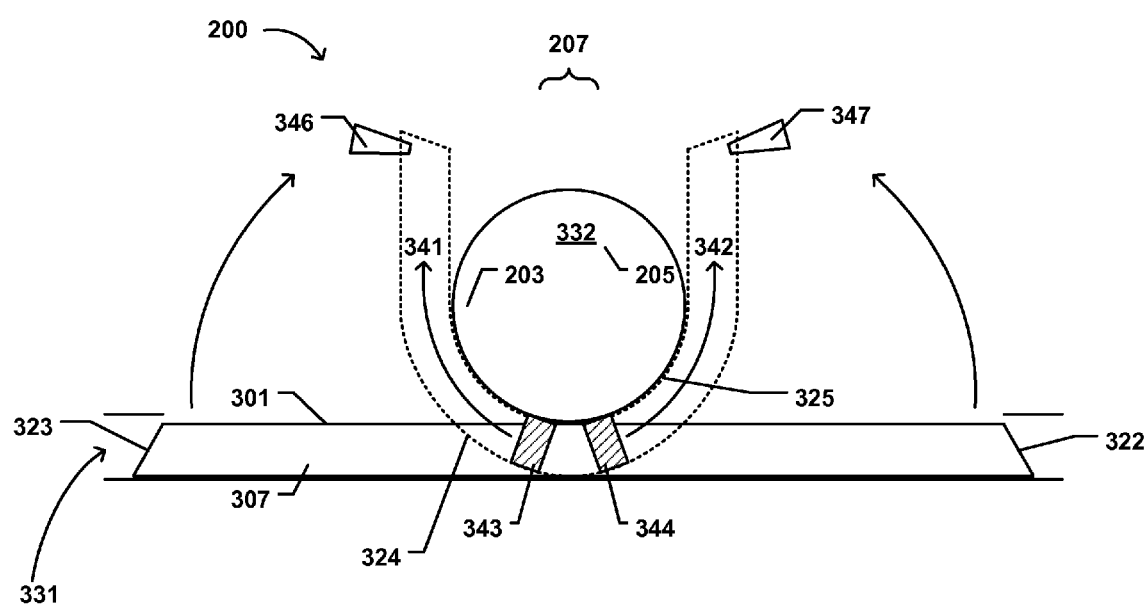
FIGS. 2A and 2B include illustrations of the process of forming the composite split washer according to an embodiment.
Figure 2B:
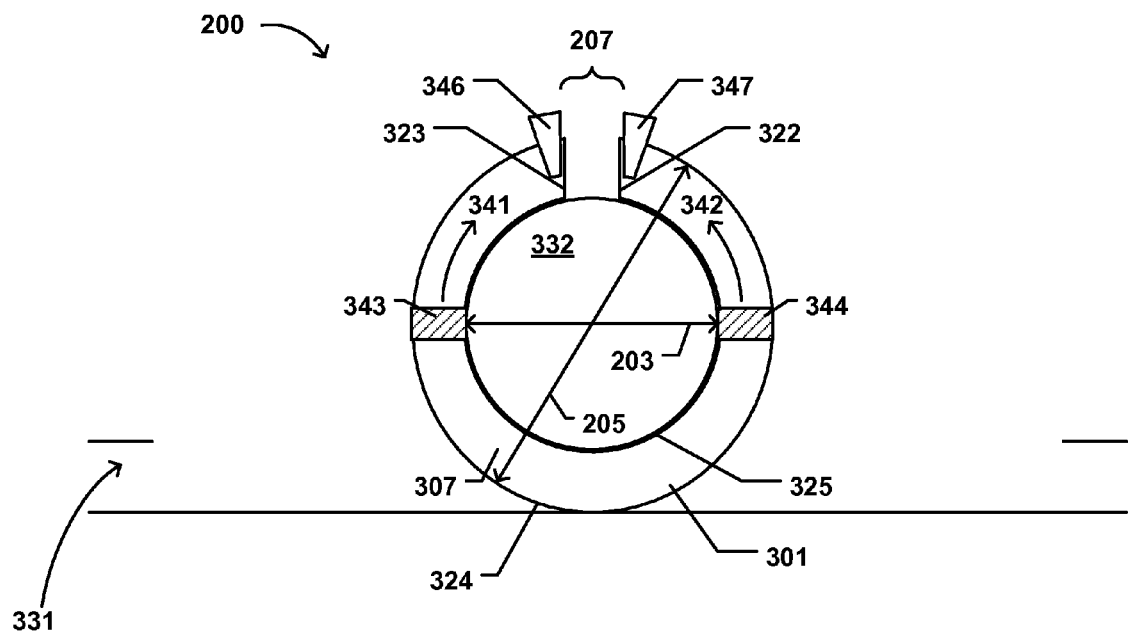

Referring again to FIG. 1, after providing the composite strip at step 101, the composite strip can be engaged in a channel at step 103, which is illustrated in FIGS. 2A and 2B. According to one embodiment, the composite strip can be machine fed into the channel 331 or can be manually fed into the channel 331. The channel 331 can have dimensions substantially similar to the dimensions of the composite strip 301 such that at least a portion of the composite strip 301 is secured in the channel 331 during forming.

In an exemplary embodiment, after the composite strip 301 is engaged in the channel 331 at step 103, the composite strip 301 engages a mandrel 332 at step 105 (see FIGS. 2A and 2B). Generally, the composite strip 301 can engage the mandrel 332 by contacting a portion of the strip to the surface of the mandrel 332. Engaging the mandrel 332 can further include securing a portion of the composite strip 301 against the mandrel 332. According to various embodiments herein, the composite strip 301 can be generally secured in the channel 331 and can engage the mandrel 332 such that the major surface 307 of the composite strip 301 is not in contact with the surface of the mandrel 332, rather an edge 325 of the composite strip 301 defined by the thickness of the composite strip 301 can be in contact with the surface of the mandrel 332 during forming.

Accordingly, the mandrel 332 can have a selected geometry and contour substantially similar to the desired geometry and contour of the final shaped composite piece. Generally, the mandrel 332 can have a polygonal shape, particularly a symmetrical polygonal shape, such as a circle, or the like. According to a particular embodiment, the mandrel 332 has a circular contour for forming a shaped composite piece having a circular contour, whereby the circumference of the mandrel substantially defines the inner circumference of the shaped composite piece (See, FIG. 2B). Generally, the size of the mandrel 332 can be altered depending upon the desired size of the shaped composite. In the context of forming a shaped composite having a circular contour, the diameter of the mandrel can be not less than about 1 cm, such as not less than about 2.5 cm, and particularly within a range of diameters between about 2.5 cm and about 15 cm.

After engaging the composite strip 301 with the mandrel at step 105, the composite strip 301 can be shaped around the contour of the mandrel at step 107, such that the major surface 307 of the composite strip 301 does not contact the mandrel 332 and is maintained in one plane. According to one embodiment, a suitable technique for forming the composite strip 301 around the mandrel 332 includes rolling the major surface 307 of the composite strip 301 under a sufficient force to guide the composite strip 301 around the mandrel 332.

According to one embodiment, the rolling force is not less than about 2.0 kN, such as not less than about 4.5 kN, or about 10 kN. In various embodiments, the force applied to the major surface 307 of the composite strip 301 can be not less than about 15 kN and particularly within a range between about 5 kN and about 50 kN.

The shaping process can also be aided by gripping the composite strip 301 and guiding the composite strip 301 around the mandrel 332 while rolling the major surface 307 of the composite strip. The process can utilize one or a plurality of gripping mechanisms 346 and 347, such as jaws or pincers which can be displaced around the mandrel 332 for engaging the composite strip 301 and maintaining sufficient force to aid the shaping process. According to a particular embodiment, a pair of jaws 346 and 347 can grip the ends 322 and 323 of the composite strip 301 while an edge 325 of the composite strip 301 engages the mandrel 332, such that at least a portion of the edge 325 substantially maintains contact with the surface of the mandrel 332 during forming. In a particular embodiment, the jaws 346 and 347 form the composite strip 301 along the shape of the mandrel 332 while rollers 343 and 344 move in the directions 341 and 342 over the major surface 307 of the composite strip. After forming half of the composite shape, a different set of jaws can grip the ends of the composite strip 301 and guide the composite strip 301 along the remainder of the mandrel 332 to finish the shaping process while the major surface 307 of the composite strip 301 is rolled under a sufficient force. Upon completion of the shaping process at step 107, the composite strip 301 can be removed from around the shape of the mandrel 332 at step 109.

Referring further to FIGS. 2A and 2B, the composite strip 301 is in the form of a split-washer 200 as illustrated, which can be formed according to the forming process described in the previous embodiments. FIG. 2B illustrates a composite strip 301 formed into an annular structure having a gap or split 207. The size of the gap can vary depending upon the product's desired application. According to one embodiment, the open annular structure has an outer circumference extending through not less than about 340°, such as not less than about 350°, or even not less than about 355°.

The split-washer of FIG. 2B has an inner diameter 203 and an outer diameter 205. According to a particular embodiment, the open annular structure has a forming threshold. As used herein, the "forming threshold" is a measure of the maximum allowable dimensions for forming a composite strip 301 using the forming process described in previous embodiments. In the context of the composite strip 301 having a circular contour, such as the split-washer 200, the forming threshold describes the maximum allowable outer diameter 205 as a ratio between the outer diameter 205 and the inner diameter 203 ($O.D._{max}/I.D.$). According to a particular embodiment, for an open annular structure having an outer diameter not greater than about 5.1 cm (approximately 2.0 inches), the forming threshold ($O.D._{max}/I.D.$) is not greater than about 1.5, such that, the maximum allowable outer diameter is not more than 1.5 times the dimension of the inner diameter. Notably, if the outer diameter is greater than 5.1 cm (approximately 2.0 inches) the forming threshold changes. According to a particular embodiment, for an open annular structure having an outer diameter greater than about 5.1 cm, the forming threshold ($O.D._{max}/I.D.$) is not greater than about 1.25, that is, the maximum allowable outer diameter is not greater than 1.25 times the dimension of the inner diameter.

In this context, the following composite annular structures are contemplated. According to one embodiment, a composite material having a substantially rigid substrate 302 and a polymer laminate 303 overlying the substantially rigid substrate 302 forms an open annular structure. The open annular structure of the composite material can have an outer diameter not greater than about 5.1 cm and a forming threshold not greater than about 1.5. Such a structure can be suitable as a seal, washer, or bearing, or particularly a thrust bearing. Indeed, a suitable polymer, such as a fluoropolymer can be used to facilitate self-lubricating properties for bearing applications. In a particular embodiment, the composite material is NORGLIDE® composite material, commercially available from Saint-Gobain Performance Plastics Corporation, 150 Dey Road, Wayne, N.J.

According to a particular embodiment, another composite annular structure is contemplated. This structure can include a metal substrate 302 and a polymer laminate 303 overlying the metal substrate 302, wherein the structure is an open annular structure. The open annular structure can have an outer diameter greater than about 5.1 cm and a forming threshold not greater than about 1.25. Such a structure can be suitable as a seal, washer, or bearing, or particularly a thrust bearing. Indeed, a suitable polymer, such as a fluoropolymer can be used to facilitate self-lubricating properties for bearing applications. In a particular embodiment, the composite material is NORGLIDE® composite material, commercially available from Saint-Gobain Performance Plastics Corporation, 150 Dey Road, Wayne, N.J.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A process comprising the steps of:
   providing a composite strip comprising a substantially rigid substrate and a polymer overlying a surface of the substantially rigid substrate defining a major surface of the composite strip; and
   shaping the composite strip with a mandrel to form a shaped composite piece having a shape substantially defined by the shape of the mandrel, wherein shaping comprises gripping the composite strip while shaping the composite strip around the mandrel and rolling the major surface of the composite strip under a force sufficient to facilitate guiding the composite strip around the mandrel, wherein during shaping, the major surface of the composite strip is substantially maintained in one plane.

2. The process of claim 1, wherein the composite strip has an aspect ratio of not less than about 5:1.

3. The process of claim 1, wherein the providing step further comprises cutting the composite strip of a discrete width from a larger composite strip.

4. The process of claim 3, wherein the width of the composite strip is not greater than about 5.0 cm.

5. The process of claim 1, wherein the providing step further comprises cutting the composite strip to a discrete length from a larger composite strip.

6. The process of claim 5, wherein the composite strip is cut to a length of not greater than about 100 cm.

7. The process of claim 1, wherein the providing step further comprises cutting ends of the composite strip at an angle to a lateral axis of the composite strip, such that a length of a first side of the composite strip is shorter than a length of an opposing side of the composite strip.

8. The process of claim 1, wherein the shaping step further comprises engaging the composite strip in a channel.

9. The process of claim 8, wherein the shaping step further comprises forming a shaped composite piece having a circular contour.

10. The process of claim 9, wherein the shaped composite piece has an outer diameter not greater than about 5.1 cm and a forming threshold not greater than about 1.5.

11. The process of claim 9, wherein the shaped composite piece has an outer diameter greater than about 5.1 cm and a forming threshold not greater than about 1.25.

12. The process of claim 8, wherein the shaped composite piece has an outer circumference and an inner circumference, the outer circumference extending through not less than about 340°.

13. The process of claim 1, wherein the polymer is a fluoropolymer.

14. The process of claim 1, wherein the substantially rigid substrate comprises a metal, a metal alloy or a combination thereof.

15. The process of claim 1, wherein the composite strip has a thickness not greater than about 5.0 mm.

* * * * *

UNITED STATES PATENT AND TRADEMARK OFFICE
CERTIFICATE OF CORRECTION

| | | |
|---|---|---|
| PATENT NO. | : 7,966,855 B2 | Page 1 of 1 |
| APPLICATION NO. | : 11/670214 | |
| DATED | : June 28, 2011 | |
| INVENTOR(S) | : Matthew A. Cordivari et al. | |

It is certified that error appears in the above-identified patent and that said Letters Patent is hereby corrected as shown below:

On the title page, item (73) Assignee, please delete "SAINT-GOBAIN CERAMICS & PLASTICS, INC., Worcester, MA 01606" and insert therefor --SAINT-GOBAIN PERFORMANCE PLASTICS CORPORATION, Aurora OH 44202--.

Signed and Sealed this
Eleventh Day of December, 2012

David J. Kappos
*Director of the United States Patent and Trademark Office*